(12) United States Patent
Monroe

(10) Patent No.: US 6,633,282 B1
(45) Date of Patent: Oct. 14, 2003

(54) BALLPOINT PEN TYPE INPUT DEVICE FOR COMPUTER

(76) Inventor: Adam A. Monroe, 12730 Hunters Chase, San Antonio, TX (US) 78230

( * ) Notice: Subject to any disclaimer, the term of this patent is extended or adjusted under 35 U.S.C. 154(b) by 0 days.

(21) Appl. No.: 09/225,050

(22) Filed: Jan. 4, 1999

(51) Int. Cl.[7] ................................................. G09G 5/00
(52) U.S. Cl. ...................... 345/179; 345/180; 345/181; 345/156; 345/182; 178/19.03; 178/19.04; 178/19.05; 178/18; 382/313; 382/119; 382/120; 382/121; 401/33; 401/34
(58) Field of Search ................................. 345/179, 180, 345/181, 182, 156; 178/19.05, 19.03, 19.04, 18; 382/313, 120, 121; 401/33, 34

(56) References Cited

U.S. PATENT DOCUMENTS

| | | | |
|---|---|---|---|
| 5,422,959 A | * 6/1995 | Lee | 382/313 |
| 5,600,348 A | * 2/1997 | Bartholow et al. | 345/180 |
| 5,850,058 A | * 12/1998 | Tano et al. | 178/18.01 |
| 5,889,512 A | * 3/1999 | Moller et al. | 345/179 |
| 5,913,629 A | * 6/1999 | Hazzard | 345/17 |
| 5,940,066 A | * 8/1999 | Weinblatt | 345/179 |
| 5,977,959 A | * 11/1999 | Katsurahira et al. | 345/179 |
| 6,044,165 A | * 3/2000 | Perona et al. | 345/179 |
| 6,050,735 A | * 4/2000 | Hazzard | 345/179 |
| 6,084,577 A | * 7/2000 | Sato et al. | 345/179 |

* cited by examiner

Primary Examiner—Richard Hjerpe
Assistant Examiner—Ali Zamani
(74) Attorney, Agent, or Firm—Jackson Walker L.L.P.

(57) ABSTRACT

A wireless input device having an outward appearance resembling a standard ballpoint pen operates as both a standard ballpoint pen or similar writing instrument as well as an input device. The pen includes directional sensors for determining the direction and length of each pen stroke. A transmitter is provided in the pen barrel for transmitting the stroke signals directly to a computer for input and processing each stroke to provide an accurate representation of the pen stroke as it is being made. The transmitter may be a wireless device for transmitting a low frequency radio signal to a receiver associated with the computer. This permits the pen to be utilized anywhere within the transmitting range of the device, and in any orientation, with the computer picking up, processing and storing the signal representing the pen strokes. The pen may also be a wired device where desired, which while making the device less versatile, may permit the incorporation of less expensive devices while preserving the general versatility of the device. The sensor system breaks the stroke signal into typical "x" and "y" coordinates, the "z" axis monitoring pressure so that the thickness and boldness of the stroke is preserve as well. Both the orientation of the stylus and the direction of the stroke may be monitored, permitting bold and thin strokes to be made such as, by way of example, in calligraphy style writing or in more sophisticated graphic representations.

20 Claims, 4 Drawing Sheets

BALLPOINT PEN TYPE INPUT DEVICE FOR COMPUTER

BACKGROUND OF THE INVENTION

1. Field of the Invention

The subject invention is generally related to an input device for entering manually created alphanumeric and graphic data into a computer and is specifically directed to a pen type input device.

2. Discussion of the Prior Art

Means for entering input into a computer system are well-known. Early computers used punched tape and punched cards to provide input to the central processing unit of the computer system. Later systems incorporated digital magnetic tape, floppy discs and other media capable of holding large amounts of data. As computers have become more user friendly, keyboards, compact disc read only memory units (CD ROMS), mouse devices and other input systems are routinely incorporated in a typical personal computer system. Voice activation systems have also been developed allowing limited audio input to be entered, whereby the computer system responds by talking to it.

Peripheral input devices are also available such as modems for receiving digitized data from any of a variety of remote sources and entering the information into the computer.

One of the major drawbacks to the ready utilization of computers by a large segment of the population is that the primary input device has become a typical typewriter keyboard. While this is very versatile and useful, it has certain drawbacks to those individuals who are not skilled typists. Hence, the voice activated systems, mouse systems and other input devices have been developed to provide more acceptable input options to those individuals who are threatened by the use of a keyboard. Many of these devices have become so well accepted that they are routinely used in connection with the standard keyboard input device to enhance the use of the computer by even the most skilled users.

With all of these devices available, one significant use of the computer and a suitable input device has been ignored. Specifically, there are no input devices, which permit the computer to directly receive data, which is manually scripted, whether it is graphic or alphanumeric in nature.

While it is true that certain devices such as stylus probes in combination with touch screen technology permit a user to manually input information on a screen, available in such devices as, by way of example, PalmPilot systems and the like, these devices are very limited and are not responsive to typical script input. For example, if a user wanted to input the data stored in a manually created inventor's note book, at the present time this would be accomplished either by recreating the data at a keyboard or by scanning the data into the system through a scanning device. Other stylus technology uses a grid or other technique to determine where the "pen" is relative to the paper or other medium.

At present there are no devices for permitting the direct input of manually scripted or created graphic and alphanumeric data into a computer system.

SUMMARY OF THE INVENTION

The subject invention is directed to a wireless pen-type input device that in its outward appearance resembles a standard ballpoint pen. In its preferred form the pen operates as both a standard ballpoint pen or similar writing instrument as well as an input device to the computer. The pen includes sensors for determining the direction and length of each pen stroke as well as the position of the pen on the paper. A transmitter is provided in the pen barrel for transmitting the stroke signals directly to the computer for input and processing each stroke to provide an accurate representation of the pen stroke as it is being made. In the preferred embodiment, the transmitter is a wireless device for transmitting radio signals to a receiver associated with the computer. This permits the pen to be utilized anywhere within the transmitting range of the device, and in any orientation, with the computer picking up, processing and storing the signal. The pen may also be a wired device where desired, which while making the device less versatile, may permit the incorporation of less expensive devices while preserving general versatility.

The sensor system breaks the stroke signal into typical "x" and "y" coordinates, the "z" axis monitoring pressure so that the thickness and boldness of the stroke is preserved and "start and stop", i.e., contact with the paper during a stroke, is monitored. Both the orientation of the stylus and the direction of the stroke may be monitored, allowing for non-symmetric shaped tips, permitting bold and thin strokes to be made such as, by way of example, in calligraphy style writing or in more sophisticated graphic representations.

In one embodiment, a video type sensor system is used, where the pen processing unit actually "looks" at where the pen is relative to an origin point on the paper or other media, both with respect to orientation and position. In another embodiment, the pen defines the point of origin based on first signal and motion sensors are used to define pen movements and orientation from the defined point of origin.

In the wireless unit, a self-contained power supply is provided, permitting the pen to be fully portable. In the preferred embodiment, the pen resembles a typical ballpoint pen and may include a pocket clip, where desired.

The pen of the subject invention permits scripted or manually created data to be put directly into a computer system. For example, it permits accurate input of a signature for original documents and the like, as well as general text and graphic information. As an example o possible uses, the pen of the invention would permit remote signature of legal documents, with an accurate facsimile of a signature being affixed to a document on a near real time basis with the act of actual signature on a physical document anywhere in the world. This would greatly facilitate the completion of legal transactions involving parties who are separated by distance.

Other uses are the storage of manually created data for archive and retrieval purposes in its original format. For example, notes kept in an inventor's notebook can be input into a computer system in the inventor's handwriting, further authenticating the electronically stored version of the information.

One of the most desirable uses of the pen is to permit unlimited alphanumeric and graphic input into a computer utilizing a manual input device, eliminating the need to recreate information on a keyboard or scanning the information into the system from hard copy.

It is, therefore, an object and feature of the subject invention to provide a manual input device for inputting manually created alphanumeric and graphic data directly into a computer.

It is a further object and feature of the subject invention to provide a device for transmitting manually generated pen strokes into a computer system simultaneously with the origination of the stroke by a user.

It is another object and feature of the subject invention to permit the use of a standard ballpoint pen as a computer input device.

It is also an object and feature of the subject invention to provide a portable, wireless input device for inputting manual pen strokes into a computer system, without restricting the position of the pen relative to the computer.

It is yet another object and feature of the subject invention to provide a device for capturing the accurate and distinctive style of a manually scripted input and introducing the input to a computer on a near real time basis.

Other objects and features of the invention will be readily apparent from the accompanying drawings and detailed description of the preferred embodiments.

DETAILED DESCRIPTION OF THE PREFERRED EMBODIMENTS

Figure 1:
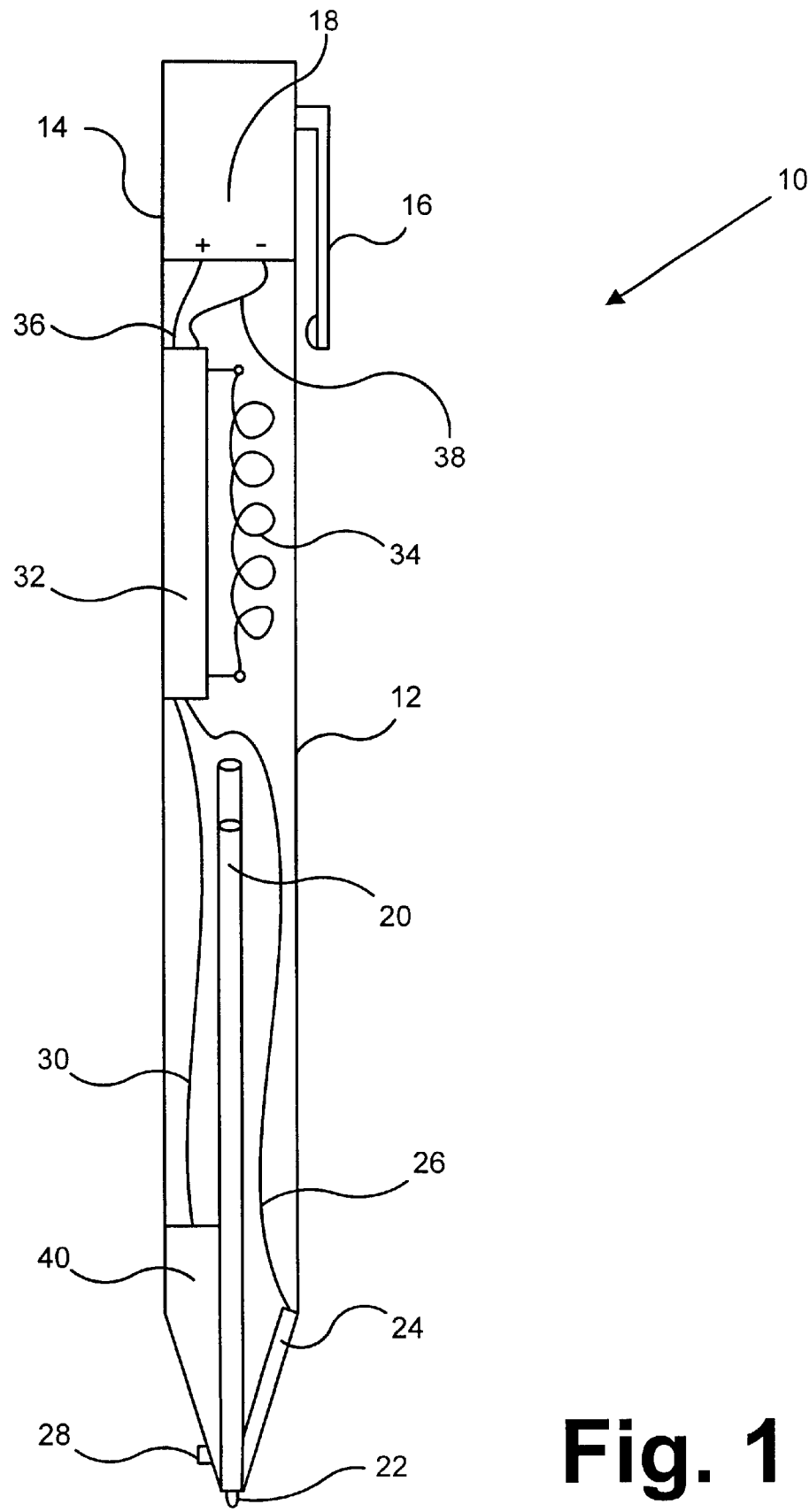
FIG. 1 is a longitudinal, cutaway view of a ballpoint pen housing adapted for carrying the pen/input device of the subject invention.

As shown in a cutaway, longitudinal view, a typical ballpoint pen housing 10 is adapted for housing the pen/input device of the subject invention. The pen barrel 12 houses the pen/input device of the subject invention, as will be described. A removable cap 14 is adapted for housing an independent power supply such as a dry cell battery unit 18. Where desired, the cap or barrel may also include a standard pocket clip 16. Other power supplies, such as, by way of example, a rechargeable system or a solar cell could also be used. The pen/input device includes a typical ballpoint pen cartridge with a rolling ball pen "point" 22. Sensors 24 and 28 are housed in the barrel 12 for monitoring the movement of the ball 22. Wires 26 and 30 are connected to sensors 24 and 28, respectively, for carrying the sensed motion signals to a transmitter 32 which transmits the motion signals to a remote receiver via a low frequency radio signal through integrated antenna 34. The transmitter/sensor system is connected to the internal power supply 18 via a coupling system such as, by way of example, the wires 36, 38. The power supply connectors can be any of the well-known contact system standard and known to those who are skilled in the art. For example, a standard flashlight connector system can be readily adapted to the present invention.

Figure 2:
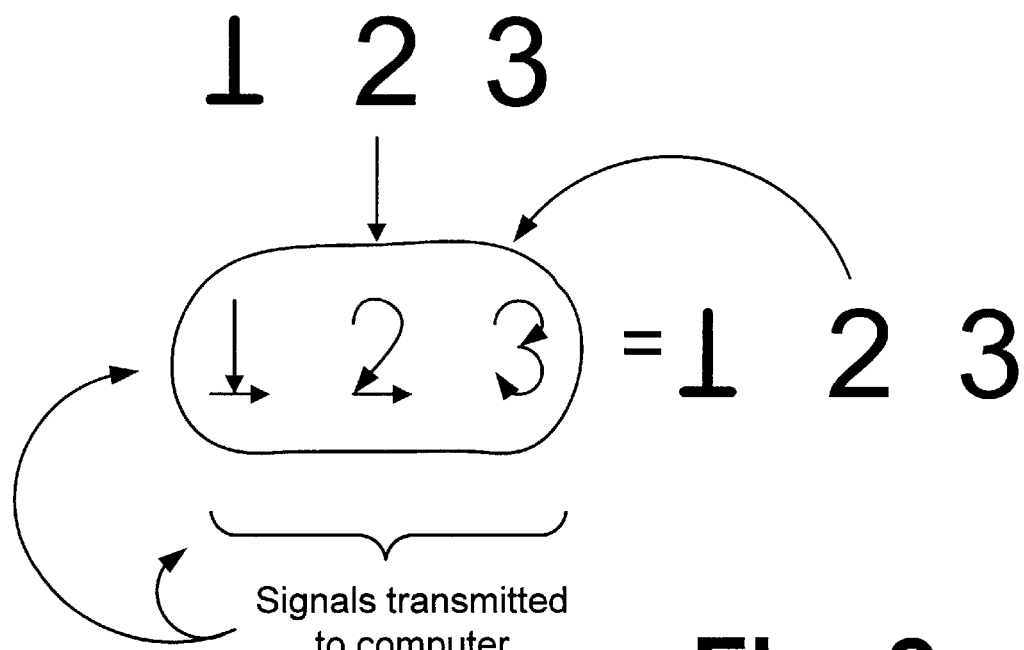
FIG. 2 is a graphic illustration of pen strokes and the transmission thereof to the computer via the sensors and transmitter system of the pen/input device of FIG. 1.

In the embodiment of FIG. 1, where video sensors 24 and 28 are utilized, the tip of the barrel 12 includes a transparent window 40 through which the sensors 24 and 28 can monitor the movements of the ball and the orientation of the pen relative to the transfer media, such as paper, not shown. This assures that the position of the pen relative to the paper is known both during a pen stroke and when the pen is lifted and moved to another portion of the paper. As best shown in FIG. 2, all motions of the pen can be defined by standard "x" and "y" coordinates. This permits any alphanumeric or graphic data to be defined by a point-to-point "x" and "y" position of the ball 22 to the paper or other media. By monitoring the position of the ball relative of a defined origin point, the "x" and "y" position data can be transmitted via the transmitter 32 to a remote computer and accurately reproduced in electronic form.

In the embodiment shown in FIG. 2, the video sensors 24 and 28 "watch" and transmit the pen movements relative to the paper. For example, the sensor 28 monitors the orientation (rotation) of the pen relative to the origin and the sensor 24 monitors the angle and distance of the pen relative to the origin in order to define the "x" and "y" coordinate of each point representing the alphanumeric or graphic input. By using an orientation sensor, the style of stroke may be monitored as well as the "x" and "y" position. Thus, if a calligraphic (flat) point were used instead of the ball, both the "thin" and "thick" line strokes can be monitored by sensing the orientation (rotation) of the point about the center axis of the pen.

Figure 3:
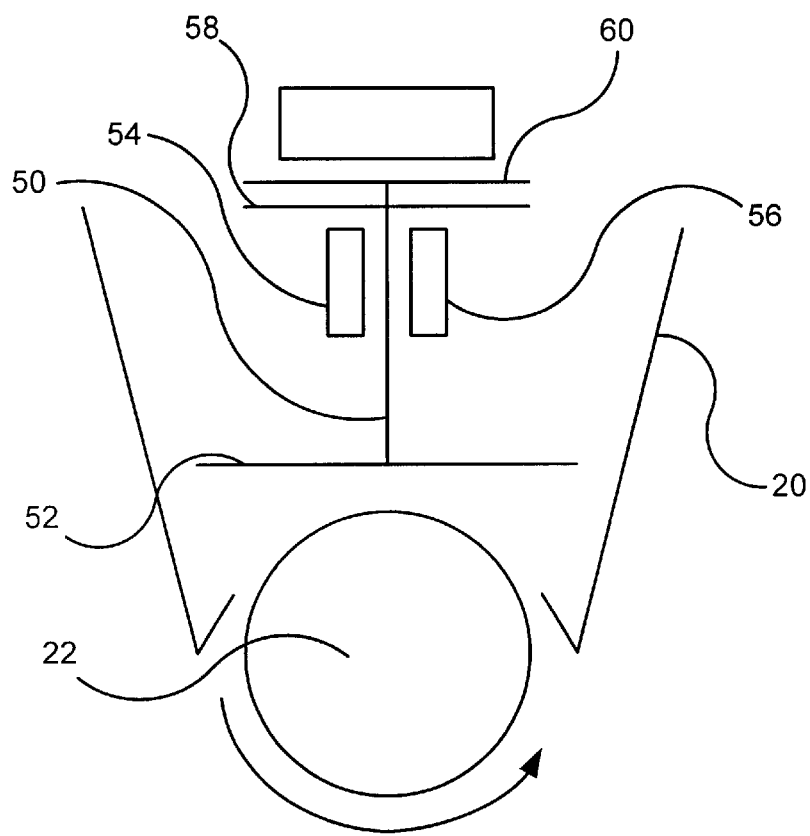
FIG. 3 is a diagrammatic view of a motion sensor system for use in combination with the pen/input device of the subject invention.

An alternative sensor system is shown in FIG. 3. As there shown, a stiff wire unit 50 is housed within the cartridge 20 and is located along the central axis of the pen. A friction contact surface 52 is positioned above and in contact with the ball 22, with sufficient clearance to permit ink to flow around the surface 52 and onto the ball. Sensors 54 and 56 are positioned around the perimeter of the wire 50 and monitor deflection of the wire to determine movement of the ball in an "x" and "y" coordinate system. Sensor 58 monitors surface speed of the ball 22 to determine actual coordinate position at any point during a stroke, via the positive contact system as indicated by contact surface 60. This permits accurate representation of the pen position by combining the "x" and "y" deflection with the speed of movement. The sensor 58 may also monitor ball pressure (or "z" axis deflection) in order to capture the boldness of the stroke.

Figure 4:
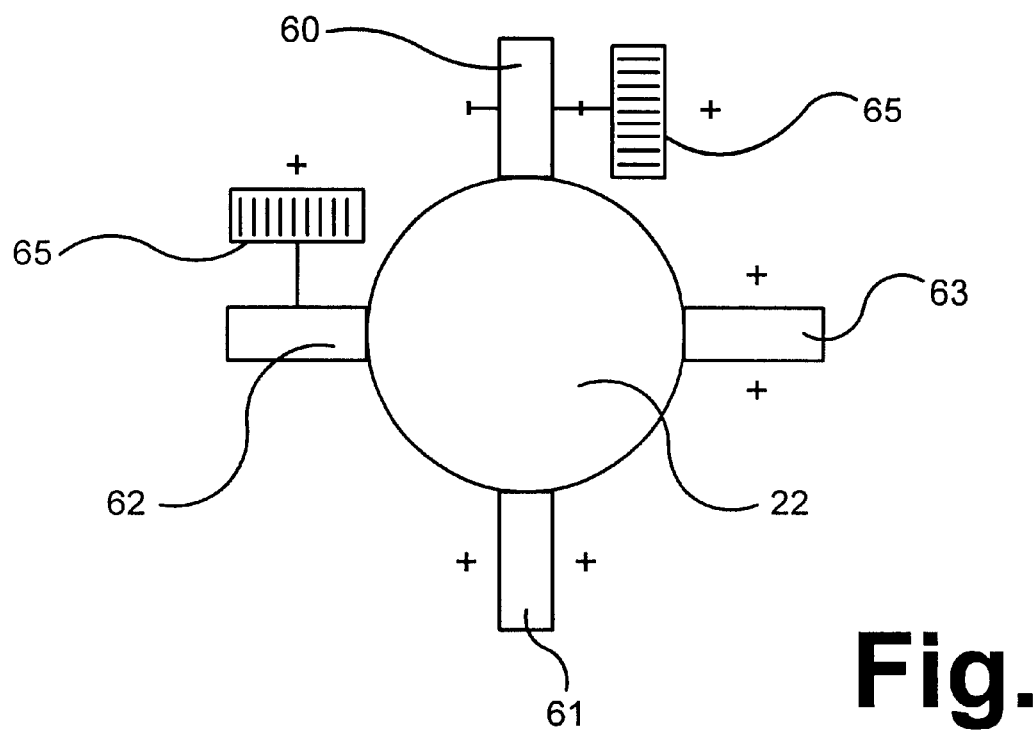
FIG. 4 is a diagrammatic view of a "mouse" type motion sensor system for use in combination with the pen/input device of the subject invention.
Figure 5:
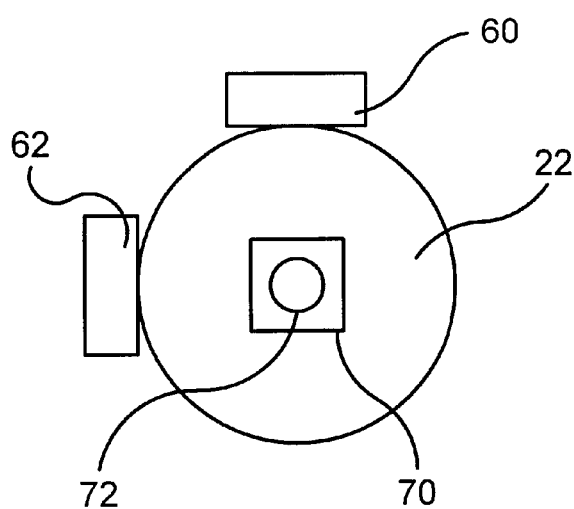
FIG. 5 is a top view looking down on the motion sensor system of FIG. 4, showing the "z" axis sensor.

A sensor system based on the mouse principal is shown in FIGS. 4 and 5. This system utilizes sensors that are in direct contact with the rolling ball 22. In this configuration, the "x" sensor is a pressure or deflection sensor having a positive contact surface 61 and a diametrically opposite negative contact surface 60. The sensor monitors the deflection of the ball in the "x" direction. The "y" sensor 62 operates in a similar manner with the positive contact 63 and the negative contact 62 measuring pressure or deflection in the "y" direction. The actual deflection is monitored on a calibrated index or reference system 65 provided in each sensor 60 and 62 and the resulting vectors give accurate "x," "y" directional coordinates for the pen motion.

The speed sensor 70 is shown in FIG. 5 and may be positioned anywhere on the ball 22. Preferably the speed sensor will be positioned on the central axis of the ball 22 so that it can also be used as a pressure ("z" axis deflection) sensor, to indicate boldness of stroke. The ball 72 provided in the sensor 70 monitors surface speed of the ball 22 and when combined with the deflection signals of sensors 60 and 62 provides an accurate signal representing direction and length of each pen stroke. In the preferred embodiment, the origin point of the pen is the first point input and all additional strokes are measured from that point. Other origin or orientation points may be defined in the wellknown manner.

Figure 6:
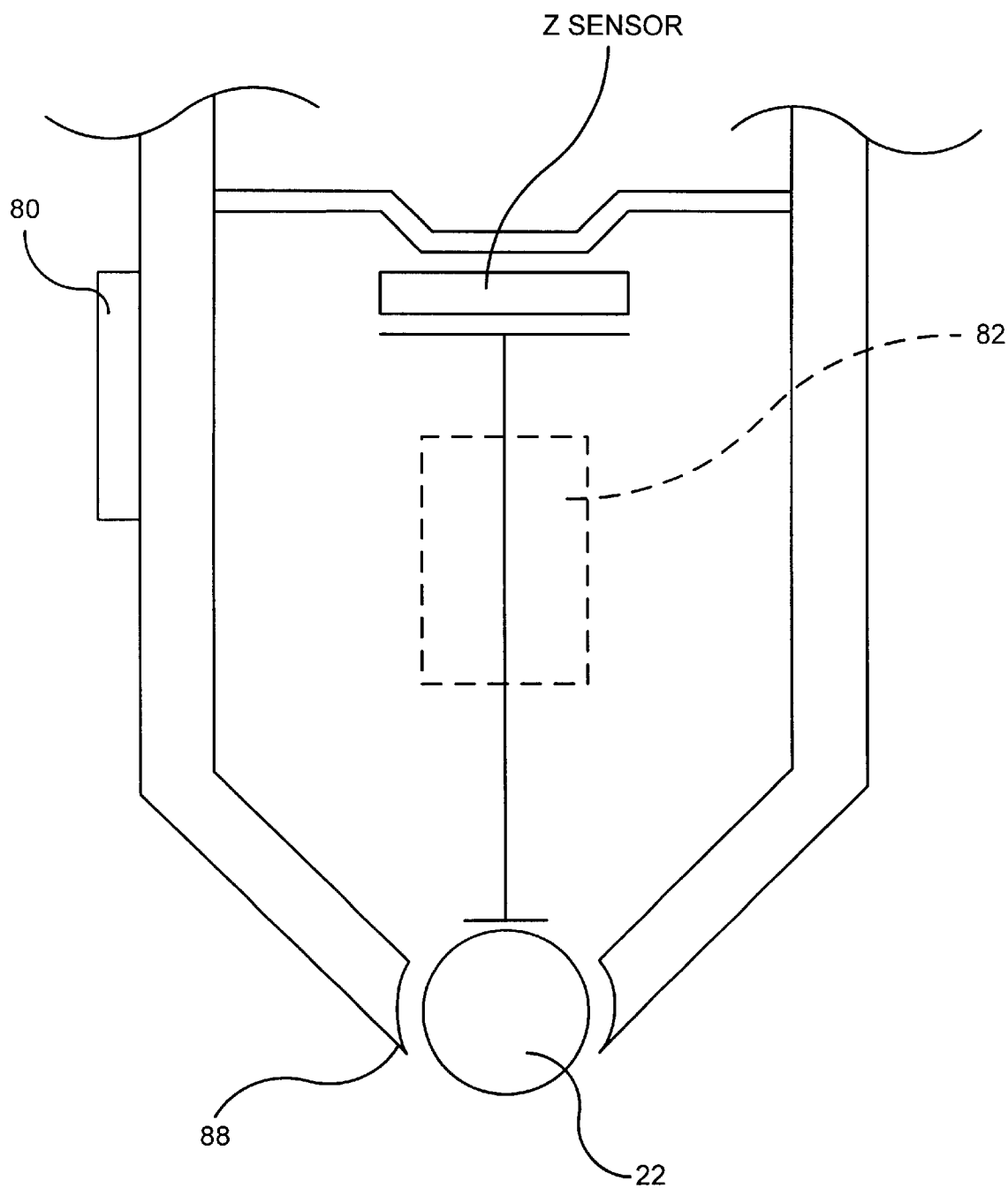
FIG. 6 is an alternative sensor system utilizing a deflection sensor configuration.

FIG. 6 is an embodiment incorporating the same principals as the embodiment of FIGS. 4 and 5, with a modified sensor construction. As in FIG. 5, the "x" sensor 80 measures "x" deflection of the contact surface 88, the "y" sensor 82 measures "y" deflection of the contact surface 88 and the "z" sensor monitors both speed and pressure.

The subject invention provides a useful, portable device for inputting manually generated data into a computer system. Where desired the wireless transmitter could be replaced with a hardwired transmitting system to reduce costs. While certain features and embodiments of invention have been described in detail herein, it will be understood that the invention includes all modifications and enhancements within the scope and spirit of the following claims.

What is claimed is:

1. An apparatus adapted for permitting the entry of manually generated alphanumeric and graphic data into a computer system, comprising:
   a. a housing having opposite ends;
   b. a writing instrument contained within the housing and presenting a writing tip at one end of the housing for writing upon a writing surface;
   c. a sensor system for detecting the position of the writing tip with respect to a writing surface and for detecting changes in position of the writing tip with respect to the writing surface; and
   d. a transmission system for transmitting the position of the writing tip to the computer system.

2. The apparatus of claim 1, wherein the sensor system includes a "y" position sensor, and an "x" position sensor for defining the position of the writing instrument in an orthogonal "x" and "y" coordinate system.

3. The apparatus of claim 1, wherein the sensor system further includes a speed sensor for monitoring the speed of motion of the writing instrument in order to determine the length of a stroke made by the writing instrument.

4. The apparatus of claim 1, wherein the sensor system further includes a "z" axis sensor for determining the pressure applied to the writing instrument.

5. The apparatus of claim 1, wherein the sensor system further includes a rotational sensor for determining the rotation of the writing instrument relative to the "x" and "y" coordinates.

6. The apparatus of claim 1, wherein the transmission system is a wireless, selfcontained system including a transmitter for sending the signals and a self-contained power supply housed in the housing.

7. The apparatus of claim 1, wherein the writing instrument comprises an ink cartridge and a rotating ball element in communication with the ink cartridge.

8. The apparatus of claim 6, wherein the sensor system is adapted for monitoring the deflection and surface speed of the ball.

9. The apparatus of claim 1, wherein the housing is a typical ballpoint pen housing having a barrel for housing the writing instrument.

10. The apparatus of claim 8, wherein the transmission system is housed in the barrel.

11. The apparatus of claim 1, wherein the "x" and "y" sensors are deflection sensors.

12. The apparatus of claim 1, wherein the "x" and "y" sensors are video sensors.

13. An input pen apparatus for entering manually generated alphanumeric and graphic data into a computer system comprising:
   a pen housing;
   a writing tip at an end of the pen housing for writing alphanumeric or graphic symbols upon a writing surface;
   a sensor means operably associated with the writing tip for determining location and movement information for the writing tip in three dimensions with respect to a writing surface.

14. The input pen apparatus of claim 13 wherein the writing tip comprises a ballpoint rolling ball and the sensor means comprises a video sensor within the housing for monitoring the movements of the rolling ball upon a writing surface.

15. The input pen apparatus of claim 13 wherein the sensor means comprises at least one video sensor for monitoring movement of the writing tip relative to a writing surface.

16. The input pen apparatus of claim 13 wherein the sensor means comprises a sensor assembly having:
   a wire unit disposed along a central longitudinal axis of the input pen apparatus, the wire unit being capable of deflection during writing by the writing tip;
   a friction contact surface maintained in contact with the writing tip; and
   at least one sensor operably associated with the wire unit to detect deflection of the wire unit.

17. The input pen apparatus of claim 13 further comprising a wireless transmitter within the pen housing for transmitting writing tip location and movement information to a remote computer.

18. The input pen apparatus of claim 13 further comprising a power supply within the pen housing.

19. The input pen apparatus of claim 16 wherein the writing tip comprises a ballpoint rolling ball and wherein the sensor assembly further comprises a sensor for monitoring the speed of movement of ballpoint rolling ball.

20. The input pen apparatus of claim 17 further comprising an antenna within the housing and operably associated with the transmitter.

* * * * *